(12) United States Patent
Gehrts et al.

(10) Patent No.: US 7,513,076 B1  
(45) Date of Patent: Apr. 7, 2009

(54) FISHING LEADER WALLET

(76) Inventors: Duffy Gehrts, 24261 S. Brockway Rd., Oregon City, OR (US) 97045; Carol Gehrts, 24261 S. Brockway Rd., Oregon City, OR (US) 97045

( * ) Notice: Subject to any disclaimer, the term of this patent is extended or adjusted under 35 U.S.C. 154(b) by 0 days.

(21) Appl. No.: 11/115,582

(22) Filed: Apr. 27, 2005

(51) Int. Cl.  
*A01K 97/06* (2006.01)

(52) U.S. Cl. .................. 43/57.1; 43/54.1; 43/4.5; 206/315.11

(58) Field of Classification Search .......... 43/54.1, 43/57.1, 4.5; 206/315.11; 224/920; D3/254; D22/136

See application file for complete search history.

(56) References Cited

U.S. PATENT DOCUMENTS

| | | | |
|---|---|---|---|
| 891,055 A | 6/1908 | Frost | |
| 1,076,894 A | 10/1913 | Langbein | |
| 1,623,429 A | 4/1927 | Martinson | |
| 2,235,369 A | 3/1941 | Heiner | |
| 2,237,412 A * | 4/1941 | Carothers | 43/54.1 |
| 2,253,598 A * | 8/1941 | Africa | 43/57.1 |
| 2,624,502 A * | 1/1953 | Evans | 229/71 |
| D268,224 S | 3/1983 | Huntebrinker et al. | D3/38 |
| 4,467,551 A | 8/1984 | Pulver | 43/54.1 |
| 4,691,469 A | 9/1987 | Alsobrook et al. | 43/54.1 |
| 4,825,584 A | 5/1989 | Raley | 43/57.1 |
| 4,852,293 A * | 8/1989 | Levine et al. | 43/54.1 |
| 4,901,899 A * | 2/1990 | Barrett | 224/223 |
| D309,977 S * | 8/1990 | Whittier | D3/276 |
| 4,970,821 A * | 11/1990 | Young | 43/54.1 |
| D323,065 S * | 1/1992 | Stricklin et al. | D3/206 |
| 5,123,197 A | 6/1992 | Gentry et al. | 43/54.1 |
| 5,632,113 A | 5/1997 | Raymond et al. | 43/54.1 |
| 5,806,236 A | 9/1998 | Lloyd | 43/57.1 |
| 6,536,156 B1 | 3/2003 | Peterson | 43/54.1 |
| 6,763,632 B1 | 7/2004 | Exby | 43/57.1 |
| 2005/0229475 A1* | 10/2005 | Dobbs et al. | 43/55 |

* cited by examiner

*Primary Examiner*—Kurt Rowan  
(74) *Attorney, Agent, or Firm*—Timothy E. Siegel Patent Law, PLLC

(57) ABSTRACT

A fishing leader wallet includes a backing of flexible opaque material having a light colored face. A sheet of flexible transparent material is sewn to the backing over the light colored face. Also, the sheet of transparent material is divided into sections by a set of thin strips of material sewn onto the backing material through the transparent material, thereby forming a set of pockets from the transparent material and the backing material.

11 Claims, 1 Drawing Sheet

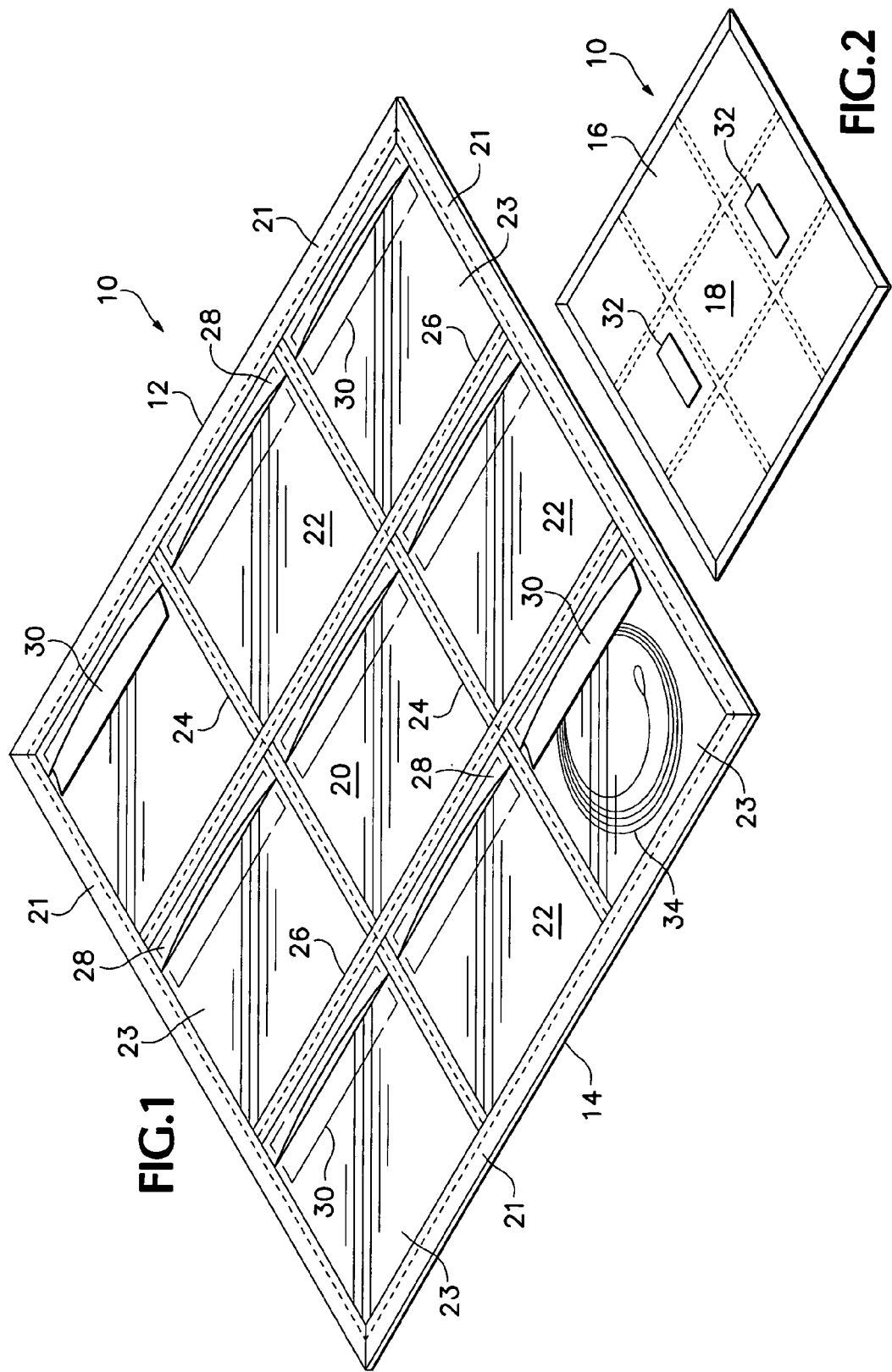

FISHING LEADER WALLET

BACKGROUND OF THE INVENTION

Although a fishing tackle box may not seem like a large object, it can take up a lot of space in a small fishing boat. Consequently, fishermen frequently leave their tackle box off a small boat and only take a few leaders with them, typically stored in plastic sandwich bags. This is an awkward system of storing leaders, however, being difficult to search through and cumbersome to manipulate.

Although various leader storage systems have been proposed over the decades, these systems are generally too busy and complex, driving up the cost of production and being somewhat difficult to handle. Moreover, in many of these systems, it is difficult to obtain a good view of the leaders, as they are stacked in compartments that are on top of each other, or simply not displayed in a beneficial manner.

SUMMARY OF THE INVENTION

In a first separate aspect, the present invention is a fishing leader wallet that includes a backing of flexible opaque material having a light colored face. A sheet of flexible transparent material is sewn to the backing over the light colored face. Also, the sheet of transparent material is divided into sections by a set of thin strips of material sewn onto the backing material through the transparent material, thereby forming a set of pockets from the transparent material and the backing material.

In a second separate aspect, the present invention is a fishing leader wallet that includes a backing of flexible opaque material and a first and a second sheet of flexible transparent material sewn to the backing. Additionally, the sheets of transparent material are divided into sections by a set of first thin strips of material sewn through the transparent material onto the backing material, thereby forming a set of pockets formed of the transparent material and the backing material. Finally, the first sheet of transparent material is divided into two sections by a thin strip of material, transverse to the first thin strips, thereby closing the bottoms of the pockets formed from the first sheet of material and providing small upper pockets for the pockets formed from the second sheet of material.

In a third separate method, the present invention is a method of storing fishing leaders. The method makes use of a fishing leader wallet having height and width and which includes a backing of flexible opaque material; a sheet of flexible transparent material. The sheet of flexible transparent material and the backing of flexible opaque material are divided into a grid of pockets formed both vertically and laterally and backed by the flexible opaque material. Leaders are placed into the pockets and the fishing leader wallet is folded both vertically and laterally, into a rectangle that is substantially smaller in height and width than the unfolded fishing leader wallet.

The foregoing and other objectives, features and advantages of the invention will be more readily understood upon consideration of the following detailed description of the preferred embodiment(s), taken in conjunction with the accompanying drawings.

BRIEF DESCRIPTION OF THE DRAWINGS

FIG. 1 is a perspective view of a first side of an unfolded fishing leader wallet, showing the pockets for storing the leaders.

FIG. 2 is a reduced in scale perspective view of the reverse side of the fishing leader wallet of FIG. 1, showing the hook and loop closure.

DETAILED DESCRIPTION OF THE PREFERRED EMBODIMENT(S)

Referring to FIG. 1, a preferred embodiment of a fishing leader wallet 10 according to the present invention has a top 12 and a bottom 14. The wallet includes an opaque flexible backing material 16 having a dark waterproof surface 18 and an opposed white surface 20. A hem 21 is formed around its entire periphery, with the dark waterproof surface, being folded over onto the white surface. A set of three sheets 22 of flexible, transparent, polymeric material are sewn into the sides and bottom of the hem 21. These sheets 22 are divided into a set of pockets 23 by a set of vertical strips 24 and a set of horizontal strips 26 of black material, which are sewn into backing material 16 through sheets 22. In a preferred embodiment each pocket 23 is about 9.5 cm×9.5 cm (3.74 in×3.74 in).

Horizontal strips 26 are sewn through the bottom part of the upper two sheets 22, so that strips 26 form the pocket bottoms for these sheets, but also form a very small upper pocket 28 of clear plastic material 22 that represents a top complement of pockets 23. An additional truncated sheet of transparent material is sewn into top portion of hem 21, to form upper pockets 28 for the top row. In an alternative preferred embodiment, the top row of upper pockets 28 is omitted.

Into the top hem 21 of liner 16 and underneath rips 26 a set of stiff nylon flaps 30 are sewn. The flaps 30 act as closures to pockets 23, either being placed inside the top of a pocket 23, or outside and permitting the stiffness of the flap 30 to provide an easily manipulated closure to the pocket 23. Referring to FIG. 2, a hook and loop closure 32, having two mating patches, is provided on backing 16 for convenient closing and opening of wallet 10. In an alternative preferred embodiment, a leader wallet has but a single row of pockets, similar to pockets 23. In this embodiment the upper closure flaps 30 may be omitted. Referring to FIG. 1, pockets 23a are upwardly-opening, and upper pockets 28 are downwardly-opening. It can also be seen that upper pockets 28 constrain flaps 30.

Skilled persons will recognize that the above described design has many advantages. First, the light color side 20 of backing 16 against which a set of leaders 34 may be placed, permits an easier visual inspection of the assortment of leaders. Fishermen must at times inspect their leaders in haste, when a quick change is required. No snaps or buttons are present that could make it harder for a fisherman, perhaps with chilled, stiff fingers, to access his leaders. Upper pockets 28 and stiff nylon flaps 30, however, help to retain the leaders against sudden movement, as may sometimes happen in a boat.

Also, wallet 10 is foldable into a compact size of about 10 cm×12 cm (roughly 4 in×5 in) to easily fit in a pants pocket. Moreover, the design lends itself to rapid construction by sewing together the various pieces. The bottom parts of the plastic sheets used to make pockets 23 form small upper pockets 28, with just a single horizontal stitch needed to produce both.

In one preferred embodiment the opaque material used for backing 16 is a polymeric coated polyester fabric available under the brand name Dockside from Vaughan Bros., of 88 SE Washington Street, Portland, Oreg. The flexible transparent material 20 may be Achilles clear plastic, also available from Vaughn Bros. and may be 0.48 mm (19 mils) thick. The hook and loop fastener material 32 is also available at Vaughn Bros. The material used for flaps 30 may be stiff seam tape, an industry standard designator and may be 3.175 cm (1.25 in) wide. Horizontal strips 26 and vertical strips 24 may be made of flat nylon cord in a width of 0.635 cm (0.25 in). These materials are available at most industrial sewing supply dealers.

The terms and expressions that have been employed in the foregoing specification are used as terms of description and not of limitation. There is no intention, in the use of such terms and expressions, of excluding equivalents of the features shown and described or portions thereof, it being recognized that the scope of the invention is defined and limited only by the claims which follow.

The invention claimed is:

1. A fishing leader wallet, comprising:
   (a) a backing of flexible opaque material;
   (b) a first and a second sheet of flexible transparent material sewn to said backing;
   (c) wherein said sheets of transparent material are divided into sections by a set of first thin strips of material sewn through said transparent material onto said backing material, thereby forming a set of pockets formed of said transparent material and said backing material;
   (d) wherein said first sheet of transparent material is divided into two sections by a second thin strip of material, transverse to said first thin strips, thereby closing the bottoms of said pockets formed from said first sheet of material and providing upper pockets aligned to said pockets formed from said second sheet of material; and
   (e) stiff flaps sewn between first thin strip of material and said backing and extending downwardly and each one being partially constrained by a said upper pocket, to form a set of partial closures for said pockets formed from said second sheet of material.

2. The fishing leader wallet of claim 1, wherein said flexible opaque material defines a first face and a second face, said flexible transparent material being sewn to said first face and said second face being waterproof.

3. The fishing leader wallet of claim 2, wherein said waterproof face is dark colored.

4. The fishing leader wallet of claim 2, wherein from 4 to 12 pockets are formed.

5. The fishing leader wallet of claim 1, wherein said stiff flaps are made of woven nylon.

6. A method of storing fishing leaders, comprising,
   (a) providing a fishing leader wallet having height and width and including:
      (i) a backing of flexible opaque material;
      (ii) a set of sheets of flexible transparent material; and
      (iii) wherein said set of sheets of flexible transparent material and said backing of flexible opaque material is divided into a grid of rectangles formed both vertically and laterally by thin strips of material sewn to the flexible opaque material, through the flexible transparent material and wherein each rectangle includes an upper downwardly-opening pocket and a lower upwardly-opening pocket and wherein stiff flaps are sewn under said thin strip so that they are interposed between said flexible transparent sheet and said flexible opaque sheet, said stiff sheets being partially constrained by said upper pockets and acting as partial closures for said lower pockets;
   (b) placing leaders into said pockets; and
   (c) folding said fishing leader wallet both vertically and laterally, into a rectangle that is substantially smaller in height and width than the unfolded fishing leader wallet.

7. The method of claim 6 wherein said backing of flexible opaque material has a front face, onto which said flexible transparent material is sewn, and a rear face onto which a pair of mating fasteners are attached, said method including a step of fastening said fasteners together after said wallet has been folded.

8. The method of claim 7 wherein said mating fasteners are mating swaths of hook and loop material.

9. The method of claim 7 wherein said fishing wallet is folded over twice vertically.

10. The method of claim 6 wherein said fishing wallet is smaller than 15 cm×16 cm (5.9 in×6.3 in) when fully folded.

11. The method of claim 5, wherein said stiff flaps are made of woven nylon.

\* \* \* \* \*

UNITED STATES PATENT AND TRADEMARK OFFICE
CERTIFICATE OF CORRECTION

| | | |
|---|---|---|
| PATENT NO. | : 7,513,076 B1 | |
| APPLICATION NO. | : 11/115582 | |
| DATED | : April 7, 2009 | |
| INVENTOR(S) | : Duffy Gehrts and Carol Gehrts | |

It is certified that error appears in the above-identified patent and that said Letters Patent is hereby corrected as shown below:

Column 2, line 3: change "rips" to --strips--.

Column 2, line 40: change "23a" to --23--.

Claim 8, first line: change "7" to --6--.

Signed and Sealed this

First Day of September, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,513,076 B1 | Page 1 of 1 |
| APPLICATION NO. | : 11/115582 | |
| DATED | : April 7, 2009 | |
| INVENTOR(S) | : Duffy Gehrts and Carol Gehrts | |

It is certified that error appears in the above-identified patent and that said Letters Patent is hereby corrected as shown below:

Column 2, line 3: change "rips" to --strips--.

Column 2, line 40: change "23a" to --23--.

Column 4, Claim 8, line 33: change "7" to --6--.

This certificate supersedes the Certificate of Correction issued September 1, 2009.

Signed and Sealed this

Twenty-second Day of September, 2009

David J. Kappos
*Director of the United States Patent and Trademark Office*